UNITED STATES PATENT OFFICE.

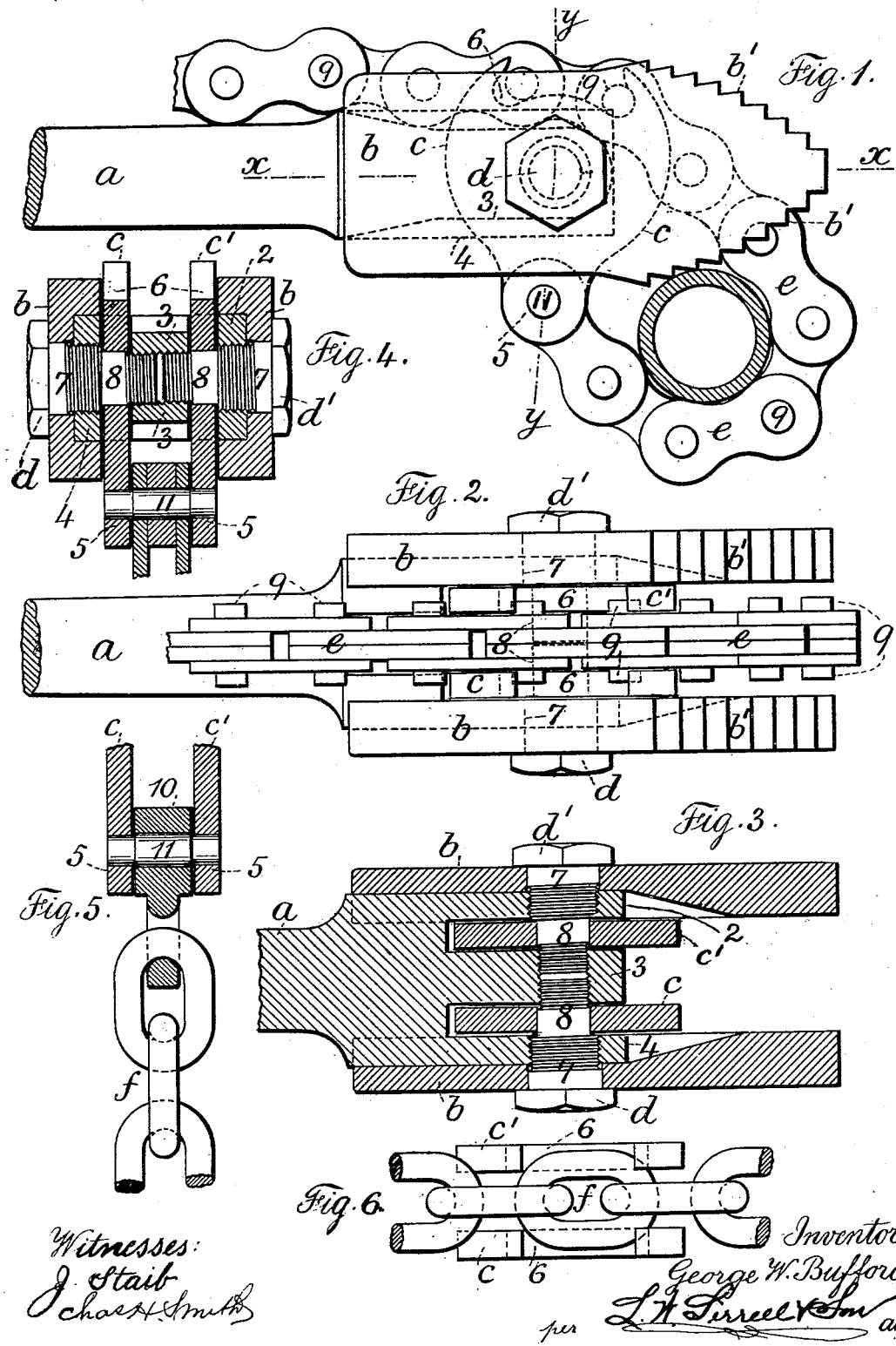

GEORGE W. BUFFORD, OF NEW YORK, N. Y., ASSIGNOR TO THE I. H. WILLIAMS & COMPANY, OF SAME PLACE.

CHAIN WRENCH.

SPECIFICATION forming part of Letters Patent No. 653,943, dated July 17, 1900.

Application filed January 11, 1900. Serial No. 1,045. (No model.)

*To all whom it may concern:*

Be it known that I, GEORGE W. BUFFORD, a citizen of the United States, residing at New York, borough of Brooklyn, in the county of Kings and State of New York, have invented an Improvement in Chain Wrenches, of which the following is a specification.

Heretofore in chain wrenches one end only of the chain was pivotally connected to the forked end of the handle-lever adjacent to or at the bolt connecting the jaws and the handle-lever, and after passing the chain around a pipe the links were engaged by recesses in the said jaws. With these wrenches the center of the chain-pivot was wide apart from the approximate center from which the curved serrated edges of the jaws were struck. Consequently the loop of chain was not materially released even by a considerable movement of the handle-lever, which movement was required to release the chain sufficient to grip the pipe in a new place.

In my improvement the end of the chain is pivotally connected to a pair of notched plates swinging in the forked end of the handle-lever, their pivot being preferably the bolt connecting the jaws and handle-lever. The chain is pivoted to said plates at one side of their pivot and the notches are at the opposite side and of sufficient length to receive the pin-rivets of a pair of links, which pins project to engage the notches, the links passing between the plates. These notches are also of sufficient length to receive the link of a link chain. In this construction the chain does not engage the fixed jaws, but the pivoted plates. Consequently the loop of chain swings on the pivot and the said loop of chain is released by a slight movement of the handle-lever. In this device short strokes of the handle-lever are effective, and the jaws having serrated edges may be made shorter than the old-style wrench, and consequently greater leverage or power be obtained.

In the drawings, Figure 1 is an elevation showing my improvement, the chain being carried around a section of pipe. Fig. 2 is a plan of the parts shown in Fig. 1. Fig. 3 is a sectional plan and partial elevation at $x$ $x$ of Fig. 1. Fig. 4 is a cross-section and partial elevation at $y$ $y$ of Fig. 1; and Figs. 5 and 6 show the connection of a link chain to the devices shown in Figs. 1 to 4, inclusive, in which figures the plate chain is shown.

The handle-lever $a$ is forked at one end, and the opposite end, to be engaged by the hands of the mechanic, is to be of any desired length. The forked end is made with three parts 2, 3, and 4, the part 3 being the widest, as shown in Fig. 3, and narrower in the direction of the elevation Fig. 1, as shown by dotted lines, this part 3 being made narrow, as shown in Figs. 1 and 4, to provide the necessary depth for the reception of the parts of the chain.

The jaws $b$ are connected upon opposite sides of the forked end of the handle-lever, against the surfaces of the parts 2 and 4. These may be of any desired outline, the form shown being preferable, and they are recessed upon their inner surfaces to receive the outer surfaces of the forked ends of the handle-lever, and they are provided with serrated edges $b'$. These jaws may be connected to the forked ends of the handle-lever by a bolt passing directly through the parts; but I prefer to employ two bolts $d$ $d'$, each of which is provided with stepped parts 7 8, threaded at their respective ends, so that there is a shoulder between the parts 7 and 8 and a smooth surface on the part 8 adjacent to the said shoulder and also a smooth part adjacent to the head of each bolt, the threaded parts being next the shoulder and end of the bolt.

By reference to Figs. 3 and 4 it will be noticed that the threads of the parts 7 screw into the forked ends 2 4 of the handle-lever and that the threads of the smaller parts 8 screw into the center portion 3 of the forked ends of the handle-lever, that the smooth portion of the bolts adjacent to the heads passes through the jaws $b$, and that the smooth portions of the parts 8 come between the respective forked ends of the handle-lever. In this manner the jaws are not only securely held to the forked ends of the handle-lever, but the said forked ends are locked to one another, the ends of the bolts coming adjacent in the center of the part 3. This form of bolt serves to effectually prevent in use the spreading apart of the forked ends of the handle-lever.

I employ the notched plates $c$ $c'$, which plates are received between the parts 2 3 and 3 4, constituting the forked ends of the handle-lever, the said bolts passing through the said notched plates and forming pivots therefor, the smooth surfaces of the part 8 of the bolts forming bearings for the said notched plates. These plates are each provided with a pivot end 5 at one side of the bearing-bolt and a notch 6 at the other side, and the notch 6 is wide enough (see Fig. 1) to receive two pin-rivets of the chain.

*e* represents a plate chain, the pin-rivets 9 of which project beyond the plates of the chain, so as to be received in the notches 6 of the plates *c c'*. A pin 11 connects one end of the chain *e* to the pivot ends 5 of the plates *c c'*.

*f* is a link chain, at one end of which is a hub 10, and through this hub is a similar pin 11, the respective ends of which are received in the pivot ends 5 of the said plates when a link chain is used instead of a plate chain. These parts are shown in Fig. 5, and in Fig. 6, which is a plan of part of a link chain and the notched edges of the said plates, I have shown that said notches are adapted to receive an entire link of the link chain.

In the operation of the chain wrench and as indicated in Fig. 1 the chain is pased around a pipe, and after the parts are drawn taut, with the pipe against the serrated edges *b'* of the jaws, the pins of the chain are passed into the notches 6 of the notched plates, and in this position the wrench may be employed in the usual manner to turn the pipe, the entire strain being carried by the bolts connecting the jaws and forked ends of the handle-lever. In this device the chain swings on the said bolts, so that the tension on the chain may be released and the pipe freed from the bite of the serrated edges of the jaws by a slight movement of the handle-lever, as by reference to Fig. 1 it will be readily seen that the serrated edges may be quickly moved away from the pipe by swinging the notched lever on the bolts as a center and that a new bite of the serrated jaws may be quickly effected on the pipe by a slight movement of the handle-lever in the reverse direction. Consequently the pipe can be quickly engaged and disengaged by the wrench as the result of the short movements of the handle-lever, which short movements are especially advantageous in cramped or confined locations. With this construction I am enabled to bring the curved serrated edges of the jaws closer to the pivot-bolt center, and consequently to shorten up the short end of the lever, and in so doing not only to effect economy in the cost of the wrench and reduce the amount of material, but increase the effective force of the wrench because of obtaining greater power with the same length of handle-lever.

I do not limit myself to the two bolts *d d'* shown and described, although I prefer the same as being more efficient than a single bolt extending across through the wrench, and I do not limit myself to the use of a plate chain, as a link chain may be employed interchangeably therewith and as effectively.

I claim as my invention—

1. In a chain wrench, the combination with a handle-lever, jaws and bolt for connecting the jaws to the handle-lever, of plates pivoted to the handle-lever and having pivots at one side and notches at the opposite side, a chain connected to the pivots of the plates and adapted to engage the notches of the plates, substantially as and for the purposes set forth.

2. In a chain wrench, the combination with the jaws having serrated edges and a pivot-bolt for securing the same, of a handle-lever forked at one end between the jaws and through which forked ends the pivot-bolt passes, plates between the forked ends of the handle-lever and through which the pivot-bolt passes, said plates having pivots at one side and edge notches at the opposite side, a chain connected to the said plates at their pivots and the links of which chain are adapted to be connected to the said plates at the notches, substantially as and for the purposes set forth.

3. In a chain wrench, a handle-lever enlarged at one end and provided with portions 2 3 and 4 at the forked end, the central portion 3 being the widest in one direction and the narrowest in the opposite direction, jaws *b* having serrated edges and notched on their inner faces and adapted to set against the outer forked ends of the handle-lever, and a bolt passing through the jaws and through the forked ends of the handle-lever to connect the parts together, plates *c c'* pivoted to the said bolt between the forked ends of the handle-lever and having pivots at one side and edge notches at the other side, a chain between the notched plates and connected to the same at the pivots and having projecting pin-rivets connecting the parts thereof together, the ends of which pins are adapted to be received in the edge notches of the said plates in use, substantially as in the manner and for the purposes set forth.

4. In a chain wrench a handle-lever enlarged at one end and provided with portions 2 3 and 4 at the forked ends, the central portion 3 being widest in one direction and the narrowest in the opposite direction, jaws *b* having serrated edges and notched on their inner faces and adapted to set against the outer forked ends of the handle-lever, plates *c c'* received between the forked ends of the handle-lever having pivots at one side and edge notches at the other side, bolts passing from opposite directions through the jaws and outer forked portions of the handle-lever and through the plates with their ends coming closely adjacent in the center portion of the forked end of the handle-lever, said bolts having threaded portions in the respective forked ends of the handle-lever, and a chain between the plates connected thereto at the pivot, the links of which chain are adapted to be received in or engaged by the edge notches of the plates in use, substantially as and for the purposes set forth.

5. In a chain wrench a handle-lever enlarged at one end and provided with portions 2 3 and 4 at the forked ends, the central portion 3 being the widest in one direction and the narrowest in the opposite direction, jaws $b$ having serrated edges and notched on their inner faces and adapted to set against the outer forked ends of the handle-lever, plates $c\ c'$ received between the forked ends of the handle-lever having pivots at one side and edge notches at the other side, bolts passing from opposite directions through the jaws and outer forked portions of the handle-lever and through the plates with their ends coming closely adjacent in the center portion of the forked end of the handle-lever, each of said bolts having a stepped portion between which is a shoulder with smooth portions adjacent to the head of the bolt and to the shoulder and threaded portions adjacent to the shoulder and the end of the bolt, the threaded portions coming in all of the forked ends of the handle-lever, and a chain between the plates connected thereto at the pivot, the links of which chain are adapted to be received in or engaged by the edge notches of the plates in use, substantially as and for the purposes set forth.

Signed by me this 6th day of January, 1900.

GEORGE W. BUFFORD.

Witnesses:
A. J. DOOHER,
JAMES H. GILVARRY.

Correction in Letters Patent No. 653,943.

It is hereby certified that the name of the assignee in Letters Patent No. 653,943, granted July 17, 1900, upon the application of George W. Bufford, of New York, N. Y. for an improvement in "Chain Wrenches," was erroneously written and printed the "I. H. Williams & Company," whereas said name should have been written and printed the *J. H. Williams & Company;* and that the said Letters Patent should be read with this correction therein that the same may conform to the record of the case in the Patent Office.

Signed, countersigned, and sealed this 24th day of July, A. D., 1900.

[SEAL.]

F. L. CAMPBELL,
*Assistant Secretary of the Interior.*

Countersigned:
   WALTER H. CHAMBERLIN,
      *Acting Commissioner of Patents.*